United States Patent Office 3,382,095
Patented May 7, 1968

3,382,095
PROCESS OF TREATING FABRIC WITH SULFO-PROPYLATED, ORGANOFUNCTIONAL SILANES AND SILOXANES
Loren A. Haluska, Midland, Mich., assignor to Dow Corning Corporation, Midland, Mich., a corporation of Michigan
No Drawing. Original application Dec. 5, 1963, Ser. No. 328,164, now Patent No. 3,328,449, dated June 27, 1967. Divided and this application Dec. 5, 1966, Ser. No. 611,196
4 Claims. (Cl. 117—139.5)

This application is a division of application Ser. No. 328,164, filed Dec. 5, 1963, now Patent No. 3,328,449.

This application relates to new, sulfopropylated, organofunctional silanes and siloxanes that are useful as detergents, ion exchange resins, wetting agents, antistat agents for synthetic fibres, and polymerization catalysts, for siloxanes.

The compositions of this invention are of the formula $Z_eSi[-R(-Y[-R'SO_3M_f]_c)_b]_a$, where R is a divalent or trivalent hydrocarbon, halohydrocarbon, or hydrocarbon ether radical, there being no more than two Y groups on any one carbon atom.

Y consists of $$-\overset{O}{\underset{\|}{C}}-O-, -S-, -O-, -\overset{O}{\underset{\|}{C}}-\overset{R''_d}{\underset{|}{N}}-, -SO_3-$$

$$-SO_2\overset{R''_d}{\underset{|}{N}}-, -\overset{R''_d}{\underset{|}{N}}-, \text{ or } -\overset{R''_d}{\underset{|}{N}}Q-\overset{R''_d}{\underset{|}{N}}-$$

where each R'' is independently selected from hydrogen or aliphatic hydrocarbon radicals from 1 through 6 carbon atoms, Q is an alkylene radical of 2 through 4 carbon atoms that separates the two N groups by at least two carbon atoms, d is an integer of 0 or 1, R' is an alkylene radical that separates Y and $SO_3$ by three carbon atoms, M consists of hydrogen, the ammonium radical, or metal atoms, c is an integer of 1 through 3; b is an integer of 1 through 2, a is an integer of 1 through 2, and f is the reciprocal of the valence of M. Z consists of hydrogen atoms or monovalent hydrocarbon, alkoxy, beta-alkoxyalkoxy, phenoxy, acyloxy, or hydrocarbyl-substituted isocyanoxy radicals, and e is an integer of 2 or 3, the sum of e and a being 4.

The compositions of this invention can also consist of a siloxane with at least one unit of the formula

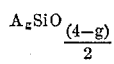

where e is an integer of 0 through 2, and the other symbols are as defined above; any other units in the siloxane being of the formula $$A_gSiO_{\frac{(4-g)}{2}}$$

where g is an integer with a value of 0 through 3, and A consists of hydrogen, monovalent hydrocarbon or halohydrocarbon radicals, alkoxy, beta-alkoxyalkoxy, acyloxy, phenoxy, hydrocarbyl-substituted isocyanoxy, or hydroxy radicals.

R can consist of any divalent hydrocarbon radical such as methylene, octadecylene, isobutylene, allylene, butadiylene, cyclohexylene, phenylene, tolylene, 1-phenyl-ethylene; any divalent halohydrocarbon radical such as chlorobutylene, decafluorooctadecylene, 3-bromopropylene, 3-chloroallylene, tetrafluorophenylene; and any divalent hydrocarbon ether such as $-CH_2CH_2OCH_2-$, $$-C_8H_{16}OCH_2CH_2OC_8H_{16}-$$

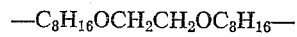

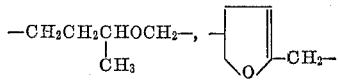

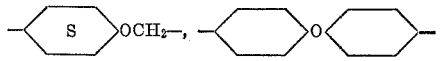

etc.

R can also be any trivalent hydrocarbon radical such as

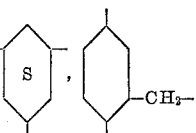

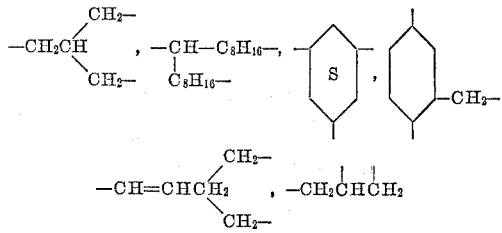

any trivalent halohydrocarbon radicals such as

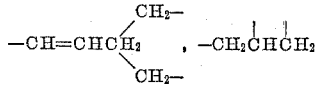

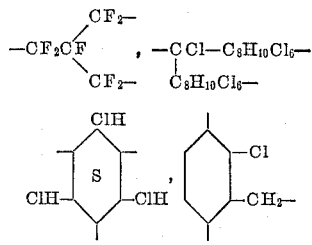

or any trivalent hydrocarbon ether such as

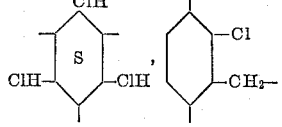

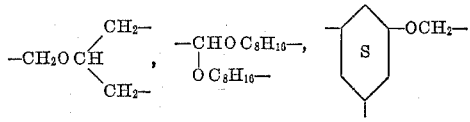

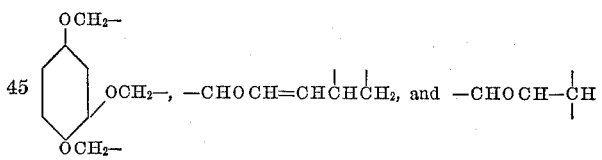

R'' can be hydrogen or any monovalent aliphatic hydrocarbon radical of 1 through 6 carbon atoms such as methyl, isopropyl, hexyl, cyclohexyl, etc.

Q can be any divalent alkylene radical of 2 through 4 carbon atoms, that separated the two N groups by at least 2 carbon atoms, such as ethylene, propylene, butylene, isopropylene, etc.

Y can be

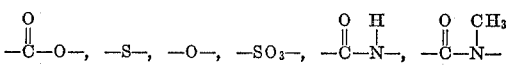

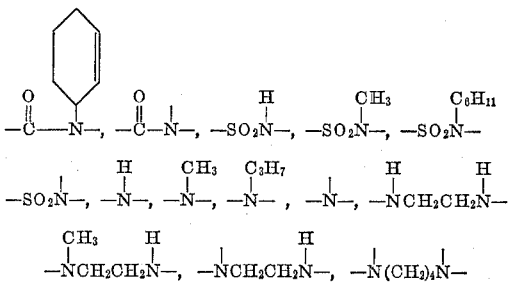

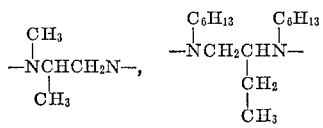
etc.

R' can be any alkylene radical that separates Y and $SO_3$ by three carbon atoms such as propylene, isobutylene, 2-ethylpropylene, 1,2,3-trimethylpropylene, 2,2-dimethylpropylene, and

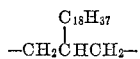

M can be hydrogen, the ammonium radical, or any metal atom such as sodium, potassium, calcium, magnesium, aluminum, iron (ferric or ferrous), manganese, copper, etc.

Z can be a hydrogen atom; any monovalent hydrocarbon or halohydrocarbon radical such as methyl, chloromethyl, octadecyl, decabromooctadecyl, 3,3,3-trifluoropropyl, vinyl, cyclohexyl, perchlorocyclohexyl, phenyl, iodophenyl, tolyl, isobutyl, etc.; any alkoxy radical such as methoxy, isopropoxy, decoxy, ethoxy, etc.; any beta-alkoxyalkoxy radical such as $CH_3OCH_2CH_2O—$, $C_2H_5OCH_2CH_2O$ $C_6H_{13}O\underset{\underset{CH_3}{|}}{C}HCH_2O—$ etc.; any acyloxy radical such as acetate, propionate, isopropionate, isobutyrate, decanoate, etc.; phenoxy; any hydrocarbyl-substituted isocyanoxy such as $(CH_3)_2C=N—O—$

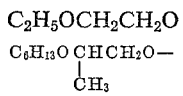

etc.

A can be a hydrogen atom; any monovalent hydrocarbon or halohydrocarbon radical such as methyl, chloromethyl, octadecyl, decabromooctadecyl, 3,3,3-trifluoropropyl, vinyl cyclohexyl, perchlorocyclohexyl, phenyl, iodophenyl, tolyl, isobutyl, etc.; any alkoxy radical such as methoxy, isopropoxy, decoxy, ethoxy, etc.; any beta-alkoxyalkoxy radical such as $CH_3OCH_2CH_2O—$, $C_2H_5OCH_2CH_2O$ $C_6H_{13}O\underset{\underset{CH_3}{|}}{C}HCH_2O—$ etc.; any acyloxy radical such as acetate, propionate, isopropionate, isobutyrate, decanoate, etc.; phenoxy; any hydrocarbyl-substituted isocyanoxy such as $(CH_3)_2C=N—O—$

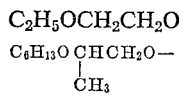

and hydroxy radicals.

Infrared studies indicate that when Y is an amino group, internal and polymeric salts can be formed between the amino and sulfonate groups.

The compositions of this invention can be made by reacting a propane sultone of the formula

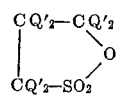

with compounds of the formula $Z_eSi[—R(YM_h)_b]_a$, or with siloxane-containing units of the formula

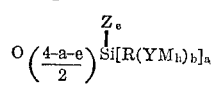

where $h$ is the valence of Y divided by the valence of M, each Q' is a hydrogen atom or an alkyl radical, and the other symbols are identified above.

It should be noted that $h$ can be fractional, i.e., that there may be more than one Y group per M group. For example, if Y is COO— (monovalent) and M is calcium (divalent), then $h$ is one-half; in other words, there are two Y groups attached to each calcium atom. But, if Y is —N— (divalent) and M is H (monovalent), then $h$ is 2. In that case, there are two M groups per Y group.

The generic reaction for making the compositions of this invention is

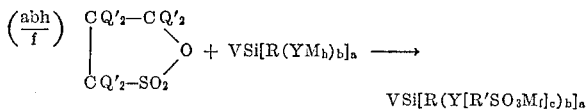

where V symbolizes the rest of the molecule, consisting of Z and/or siloxane groups; the product being the composition of this invention.

For example, if we wish to react 3-hydroxy-1-propane sulfonic acid sultone with

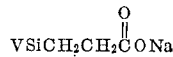

we can see that $a$ equals 1, $b$ equals 1, $h$ equals 1/1 or 1, and $f$ equals 1/1. Therefore, $abh/f$ equals 1, i.e., one mole of sultone reacts with one mole of silyl group.

However, if we use

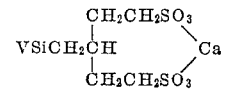

instead of the above silyl compound, then $a$ equals 1, $b$ equals 2, $h$ equals ½, and $f$ equals ½. $abh/f$, therefore, equals 2, meaning that two moles of sultone can react with one mole of silyl group.

$h$ and $f$ are included in the expression $abh/f$ to account for the case where Y and M are of unequal valence. For example, if we replace the above silyl compound with

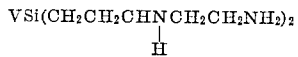

then $a$ equals 2, $b$ equals 1, $h$ equals 3/1, and $f$ equals 1/1; $abh/f$, therefore, equals 6; i.e., up to six moles of sultone will react with each mole of the above silyl compound.

This reaction can be run anywhere in the range of about 20 to 150° C. A common solvent such as methanol or benzene is added to the reaction mixture along with the reactants. Heating of the reaction mixture should be with caution, for some of the reactions are exothermic, e.g. reactions where the primary amine is involved.

If the product is not an insoluble salt, as many of the metal salts are, an alkaline catalyst will often push the equilibrium of the reaction toward the product end, enhancing the yield.

The reactants can all be prepared by well-known processes; many of them are sold commercially.

The sultones shown above can be prepared by reacting sodium bisulfite with a compound of the following formula:

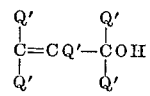

where Q' is defined above. The reaction is as follows:

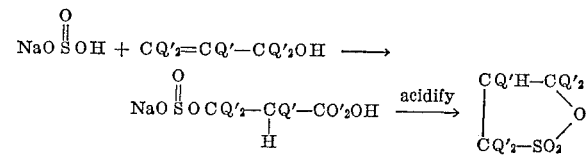

Numerous other methods for preparing sultones are known to the art. For example, German Patent 1,107,220 discloses the method of heating gamma or delta-halosulfonic acid salts of sodium or ammonium in a vacuum, to obtain a sultone plus the halide of sodium or ammonium. German Patent 902,615 discloses the method of making sultones from aliphatic ether monosulfonic acids. A number of other methods can also be found in the literature.

The following examples are illustrative only and are not to limit this invention, which is properly delineated in the claims.

EXAMPLE 1

In a flask was placed 115.8 g. of

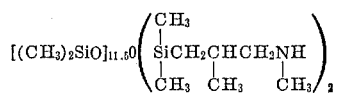

and 230 ml. of benzene. The mixture was refluxed for two hours to drive moisture from the system. The mixture was cooled to 27° C. and 24.4 g. of 3-hydroxy-1-propane sulfonic acid sultone was added over a period of one minute. The reaction was somewhat exothermic. The reaction product was stripped to 140° C. at 2.0 mm. pressure to remove the benzene. The residue had the following structure:

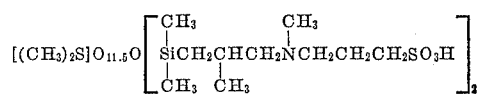

EXAMPLE 2

In a flask was placed 111.2 g. of $(CH_3O)_3Si(CH_2)_3NHCH_2CH_2NH_2$ and 230 ml. of benzene. This was refluxed for one hour at 85–86° C. to remove moisture. The reaction mixture was cooled to 31° C., and 61.1 g. of 3-hydroxy-1-propane sulfonic acid sultone was added. Within two minutes the reaction temperature had increased to 48° C.

The product was stripped to 144° C. at 18 mm. pressure to remove the solvent. A product of the following structure was obtained:

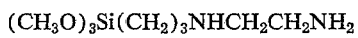

EXAMPLE 3

In a flask was placed 13.6 g. of

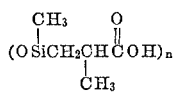

5.5 g. of sodium methoxide, and 77.7 g. of methanol. An exothermic reaction resulted.

To this mixture was added 12.2 g. of 3-hydroxy-1-propane sulfonic acid sultone, and the reaction mixture was refluxed at 65.5° C. for two hours.

The methanol was evaporated from the solution, and the product isolated. 25.8 g. of

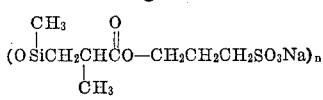

was obtained as an amorphous solid.

EXAMPLE 4

In a 500 ml. flask was placed 20.1 g. of

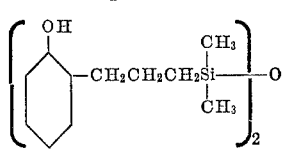

77.7 g. of methanol, and 5.5 g. of sodium methoxide. The mixture was warmed in a range of 26.5 to 32° C. while an exothermic reaction took place, completely reacting the sodium methoxide.

Then 12.4 g. of 3-hydroxy-1-propane sulfonic acid sultone was added, and the reaction mixture was refluxed at 66.5° C. for 2 hours.

A pink, solid product was obtained on removing the methanol.

The product was believed to be

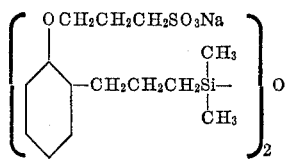

EXAMPLE 5

In a 500 ml. flask was placed 27.8 g. of $(CH_3O)_3Si(CH_2)_3NHCH_2CH_2NH_2$ and 45.9 g. of 3-hydroxy-1-propane sulfonic acid sultone was added over a 30 second period. The temperature of the reaction mixture rose from 28° C. to 94° C. without outside heating. On cooling, a hydroscopic solid was isolated with a formula:

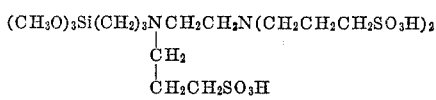

EXAMPLE 6

In a 500 ml. flask was placed 19.6 g. of $(CH_3O)_3SiCH_2CH_3SH$ 100 ml. of methanol, and 5.49 g. of sodium methoxide. The temperature of the reaction mixture rose slightly, indicating the formation of $(CH_3O)_3SiCH_2CH_2SNa$.

12.2 g. of 3-hydroxy-1-propane sulfonic acid sultone was added to the mixture at 31° C. The temperature rose to 44° C. The mixture was refluxed at 64.5° C. for three hours.

A white, solid precipitate was recovered on cooling that was believed to be $(CH_3O)_3SiCH_2CH_2SCH_2CH_2CH_2SO_3Na$

EXAMPLE 7

When 300 g. of

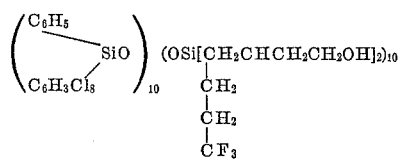

is mixed with 90 g. of

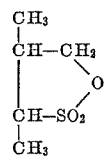

in 500 g. of benzene, the following product is obtained:

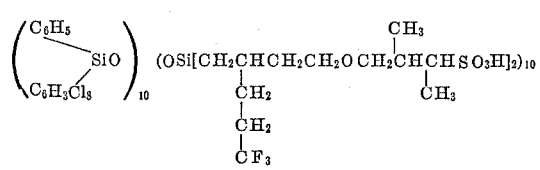

EXAMPLE 8

When 100 g. of

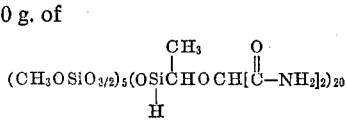

is mixed with 12.4 g. of

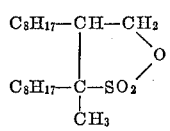

the following product is obtained:

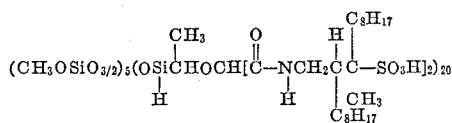

EXAMPLE 9

When 50 g. of

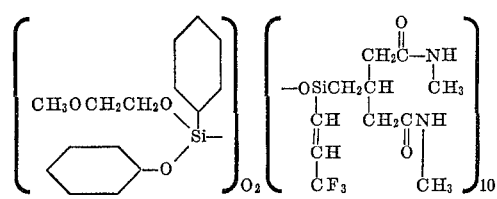

are reacted with 5 g. of 3-hydroxy-1-propane sulfonic acid sultone, the following product is obtained:

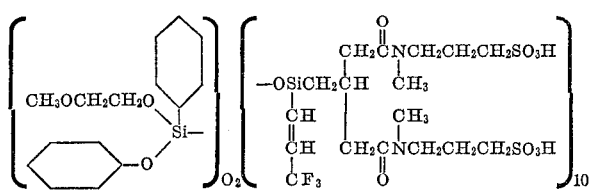

EXAMPLE 10

When 50 g. of

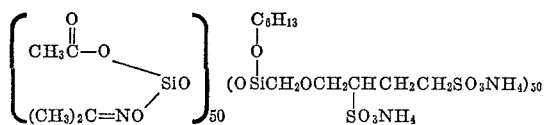

are reacted with 20 g. of

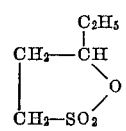

the following product is obtained:

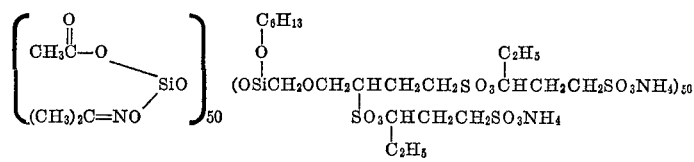

EXAMPLE 11

When 10 g. of

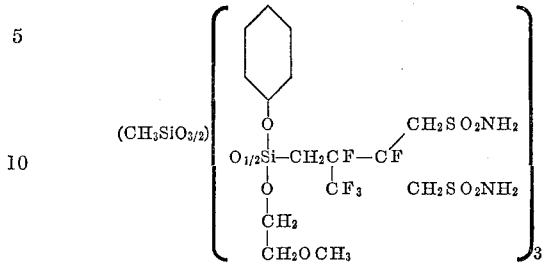

is reacted with 2.5 g. of 3-hydroxy-1-propane sulfonic acid sultone, the following product is obtained:

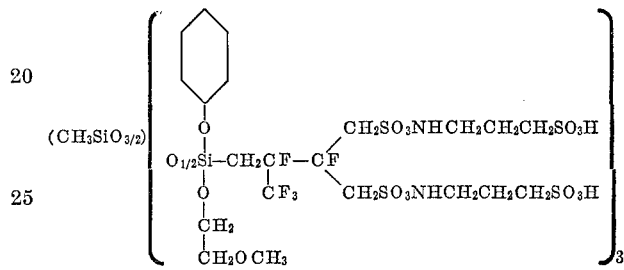

EXAMPLE 12

When 10 g. of

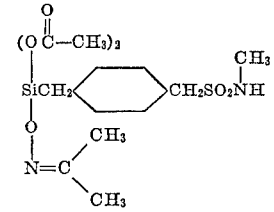

is reacted with 3.1 g. of 3-hydroxy-1-propane sulfonic acid sultone, the following product is obtained:

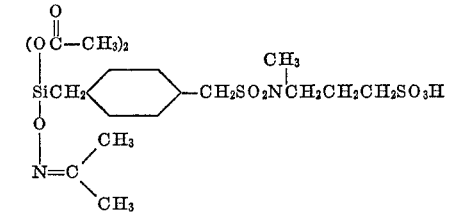

EXAMPLE 13

When 12 g. of

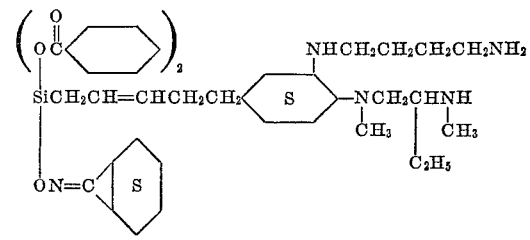

and 6 g. of 3-hydroxy-1-propane sulfonic acid sultone are reacted, the following product is obtained:

$$\left(O=\overset{O}{\overset{\|}{C}}\langle\phantom{xx}\rangle\right)_2 \quad \begin{array}{c}CH_2CH_2CH_2SO_3H\\|\\NCH_2CH_2CH_2CH_2N(CH_2CH_2CH_2SO_3H)_2\end{array}$$

$$\underset{|}{SiCH_2CH=CHCH_2}\langle S\rangle$$

$$\underset{O}{\overset{|}{N}}=C\langle S\rangle \quad \begin{array}{c}NCH_2CH-NCH_2CH_2CH_2SO_3H\\|\phantom{xx}|\\CH_3\phantom{x}|\phantom{x}CH_3\\\phantom{xxxx}C_2H_5\end{array}$$

EXAMPLE 14

When 10 g. of $$(CH_3)_3SiCH_2CH_2CHCH_2C=O$$
$$\phantom{xxxxxxxxxxx}|\phantom{xxxxxxx}\backslash$$
$$\phantom{xxxxxxxxxxx}O=CO-Ca\phantom{xx}O$$

is reacted with 9.6 g. of 3-hydroxy-1-propane sulfonic acid sultone, the following product is obtained:

$$(CH_3)_3SiCH_2CH_2CHCH_2\overset{O}{\overset{\|}{C}}OCH_2CH_2CH_2$$
$$\phantom{xxxxxxxxxxxxxxx}|\phantom{xxxxxxxxxxxxxxxx}\backslash SO_3$$
$$\phantom{xxxxxxx}O=COCH_2CH_2CH_2SO_3-Ca$$

EXAMPLE 15

(A) 2 g. of $$[(CH_3)_2SiO]_{11.5}[O_{1/2}\overset{CH_3}{\overset{|}{Si}}CH_2\overset{CH_4}{\overset{|}{C}}HCH_2\overset{CH_3}{\overset{|}{N}}CH_2CH_2CH_2SO_3H]_2$$
$$\phantom{xxxxxxxxxxxxxxxxxx}|\\\phantom{xxxxxxxxxxxxxxxxxx}CH_3$$

were dissolved in 98 g. of $CH_3OH$. A 5 inch by 7 inch square of nylon fabric was dipped in this solution and dried in the air.

(B) 2 g. of $(CH_3O)_3SiCH_2CH_2CH_2NHCH_2$
$\phantom{xxxxxxxxxxxxxxxxx}CH_2NHCH_2CH_2CH_2SO_3H$ were dissolved in 98 g. of $CH_3OH$. A 5 inch by 7 inch square of nylon fabric was dipped in this solution and dried in the air.

(C) A 5 inch by 7 inch square of nylon fabric was not treated.

The three nylon squares were each rubbed in one direction several times with a glass rod. The squares were placed over but not in contact with cigarette ashes. Ashes were found to be picked up only by sample C.

EXAMPLE 16

When polyacrylic, polyolefin, and polyester fabrics are immersed in a solution of from 0.25 to 30 weight percent of one or more of the compositions disclosed in Examples 1 through 15 where M is hydrogen, and from 99.75 to 70 weight percent of a volatile solvent that does not react with the fabric or the solute to be used and the fabrics are dried, said fabrics have a reduced tendency to acquire a static electricity charge.

Suitable solvents for this use are, among others, water, methanol, ethanol, isopropanol, hexane, cyclohexane, octane, decane, benzene, toluene, acetone, diethylether, etc.

In cases where siloxanes are employed, the mol percent of the sulfonate-containing siloxane units must be sufficiently high to impart an antistat effect to fabrics.

I claim:

1. The process of reducing the tendency of fabric to acquire a static electrical charge by
   (1) immersing said fabric in a solution of
      (A) 0.25 to 30% by weight of a composition of the formula $Z_eSi[R(Y[R'So_3H]_c)_b]_a$, where
         R is selected from the group consisting of divalent and trivalent hydrocarbons, halohydrocarbon, and hydrocarbon ether radicals, Y is selected from the group consisting of $$-\overset{O}{\overset{\|}{C}}-O-,\ -S-,\ -O-,\ -\overset{O}{\overset{\|}{C}}-\overset{(R'')_d}{\overset{|}{N}}-,\ -SO_3-$$
         $$-SO_2\overset{(R'')_d}{\overset{|}{N}}-,\ -\overset{(R'')_d}{\overset{|}{N}}-\ \text{and}\ -\overset{(R'')_d}{\overset{|}{N}}-Q-\overset{(R'')_d}{\overset{|}{N}}-$$

where each
         R'' is independently selected from the group consisting of hydrogen and aliphatic hydrocarbon radicals of 1 through 6 carbon atoms,
         Q is an alkylene radical, of 2 through 4 carbon atoms that separates the two N groups by at least two carbon atoms, and
         d is an integer of 0 through 1,
         R' is an alkylene radical that separates Y and $SO_3$ by three carbon atoms,
         c is an integer of 1 through 3,
         b is an integer of 1 through 2,
         a is an integer of 1 through 2,
         Z is selected from the group consisting of hydrogen atoms and monovalent hydrocarbon, halohydrocarbon, alkoxy, beta-alkoxyalkoxy, phenoxy, acyloxy, and hydrocarbyl-substituted isocyanoxy radicals, and
         e is an integer of 2 through 3, the sum of e+a being 4, and
      (B) 99.75 to 70% by weight of a volatile solvent that is not reactive with the fabric or ingredient (A); and
   (2) drying the fabric.

2. The process of claim 1 where ingredient (A) is
   $(CH_3O)_3SiCH_2CH_2CH_2NHCH_2$
   $\phantom{xxxxxxxxxxxxxxxxx}CH_2NHCH_2CH_2CH_2SO_3H$ 3. The process of reducing the tendency of fabric to acquire a static electrical charge by
   (1) immersing said fabric in a solution of
      (A) 0.25 to 30% by weight of a siloxane containing an effective amount of units of the formula $$\frac{O_{(4-a-e)}}{2}\overset{Z_e}{\overset{|}{Si}}[R(Y(R'SO_3H)_c)_b]_a$$

where
      R is selected from the group consisting of divalent and trivalent hydrocarbon, halohydrocarbon, and hydrocarbon ether radicals,
      Y is selected from the group consisting of $$-\overset{O}{\overset{\|}{C}}-O-,\ -S-,\ -O-,\ -\overset{O}{\overset{\|}{C}}-\overset{(R'')_d}{\overset{|}{N}}-,\ -SO_3-$$
      $$-SO_2\overset{(R'')_d}{\overset{|}{N}}-,\ -\overset{(R'')_d}{\overset{|}{N}}-,\ \text{and}\ -\overset{(R'')_d}{\overset{|}{N}}-Q-\overset{(R'')_d}{\overset{|}{N}}-$$

where each
      R'' is independently selected from the group consisting of hydrogen and aliphatic hydrocarbon radicals of 1 through 6 carbon atoms,
      Q is an alkylene radical, of 2 through 4 carbon atoms that separates the two N groups by at least two carbon atoms, and
$d$ is an integer of 0 through 1,
R' is an alkylene radical that separates Y and $SO_3$ by three carbon atoms,
$c$ is an integer of 1 through 3,
$b$ is an integer of 1 through 2,
$a$ is an integer of 1 through 2,
Z is selected from the group consisting of hydrogen atoms and monovalent hydrocarbon, halohydrocarbon, alkoxy, beta-alkoxyalkoxy, phenoxy, acyloxy, and hydrocarbyl-substituted isocyanoxy radicals, and
$e$ is an integer of 0 through 2, any other units in the siloxane being of the formula

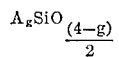

where
$g$ is an integer with a value of 0 through 3, and

A is selected from the group consisting of hydrogen, monovalent hydrocarbon and halocarbon radicals, alkoxy, beta-alkoxyalkoxy, acyloxy, phenoxy, hydrocarbyl,substituted isocyanoxy, and hydroxy radicals; and
(2) drying the fabric.
4. The process of claim 3 where ingredient (A) is

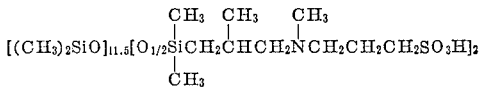

References Cited
UNITED STATES PATENTS 3,155,533   11/1964   Schaschl et al. _____ 117—139.5
3,164,481   1/1965   Shibe _____ 117—139.5
3,197,333   7/1965   Schonfeldt et al. ____ 117—139.5

WILLIAM D. MARTIN, *Primary Examiner.*

T. G. DAVIS, *Assistant Examiner.*